(12) United States Patent
Wu

(10) Patent No.: US 6,181,240 B1
(45) Date of Patent: Jan. 30, 2001

(54) TIRE-SAFETY SENSING DEVICE (76) Inventor: Lih Tian Wu, P.O. Box 82-144, Taipei (TW)

(*) Notice: Under 35 U.S.C. 154(b), the term of this patent shall be extended for 0 days.

(21) Appl. No.: 09/567,218

(22) Filed: May 9, 2000

(51) Int. Cl.⁷ .................................................. B60C 23/00
(52) U.S. Cl. ..................... 340/442; 340/443; 340/444; 340/438; 340/73
(58) Field of Search ................................... 340/442, 444, 340/443, 438, 73

(56) References Cited

U.S. PATENT DOCUMENTS

| | | | |
|---|---|---|---|
| 5,327,116 | * 7/1994 | Davidson | 340/443 |
| 5,486,807 | * 1/1996 | Price | 340/443 |
| 5,520,045 | * 5/1996 | Edri | 73/146 |
| 5,593,481 | * 1/1997 | Gardner | 340/442 |

* cited by examiner

Primary Examiner—Daniel J. Wu
Assistant Examiner—Tai T. Nguyen
(74) Attorney, Agent, or Firm—A & J (57) ABSTRACT

A tire-safety sensing device includes a supporting rod having one end connected to the body of the vehicle, located beside a tire, a fixing peg to pivotally connect the sensing device to a sensing rod to provide swinging motion, a contacting wheel with a bearing mounted onto the top end of the sensing rod, a spring (tortional spring) being mounted to the fixing peg, the two ends of the spring being mounted to a protrusion within a notch provided at the supporting rod and a protrusion of the sensing rod, the spring urges the sensing rod towards the tire such that the contacting wheel is in contact with the tire.

6 Claims, 9 Drawing Sheets

TIRE-SAFETY SENSING DEVICE

BACKGROUND OF THE INVENTION a) Technical Field of the Invention

The present invention relates to a tire-safety sensing device, and in particular, to a device which can sense the status of the tire pressure of a vehicle during driving so that safety precautions can be taken in case the tire pressure is insufficient.

b) Description of the Prior Art

The tires of a vehicle are used to support the weight of the vehicle and the friction between the tires and the road surface may cause a leakage in air pressure, in particular, when the vehicle is driven at a high speed. The excessive bumping of the tires with the road causes the tire pressure to be insufficient. However, there is no effective device to detect the condition of the tire pressure. If the tires with insufficient pressure are not properly treated or maintained, the tires may be exploded or punctured, and this will endanger the driver. Accordingly, it is a main object of the present invention to provide a tire-safety sensing device which overcome the above drawback.

SUMMARY OF THE INVENTION

Accordingly, it is an object of the present invention to provide a tire-safety sensing device which can sense the tire pressure whether the pressure is at normal condition or insufficient while driving.

Yet another object of the present invention is to provide a tire-safety sensing device, wherein precautionary action can be taken in case the tire pressure is insufficient.

Yet another object of the present invention is to provide a tire-safety sensing device comprising a supporting rod having one end connected to the body of the vehicle beside the tire, a sensing device, mounted at the supporting rod, including a fixing peg to pivotally connect the device to a sensing rod to provide swinging motion, a contacting wheel with a bearing mounted onto the top end of the sensing rod, a spring (torsional spring) being mounted to the fixing peg, the two ends of the spring being mounted to a protrusion within a notch provided at the supporting rod and a protrusion of the sensing rod, the spring urges the sensing rod towards the tire b such that the contacting wheel is in contact with the tire b.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1:
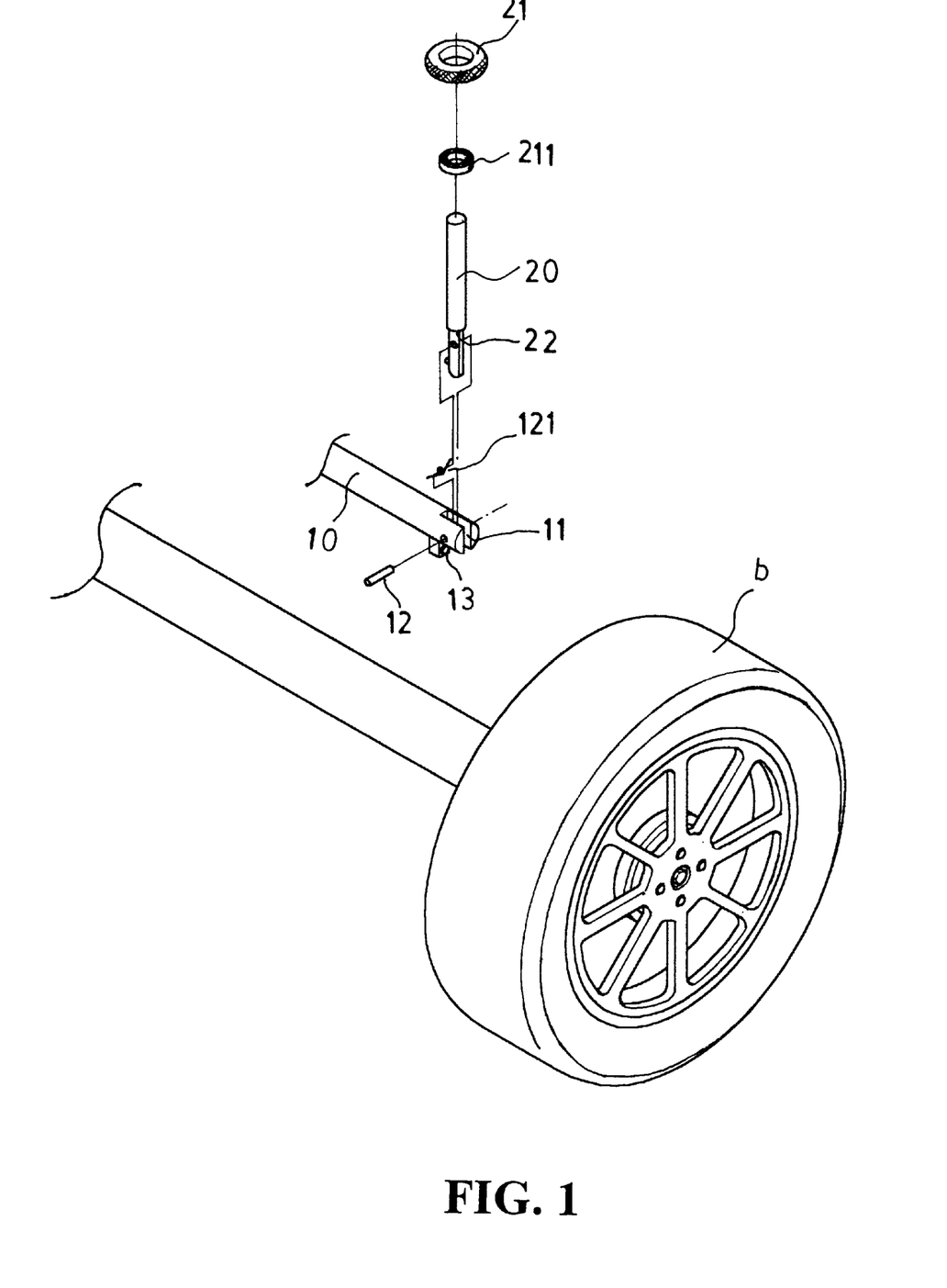
FIG. 1 is a perspective exploded view of a tire-safety sensing device applied to the rear wheel in accordance with the present invention.
Figure 2:
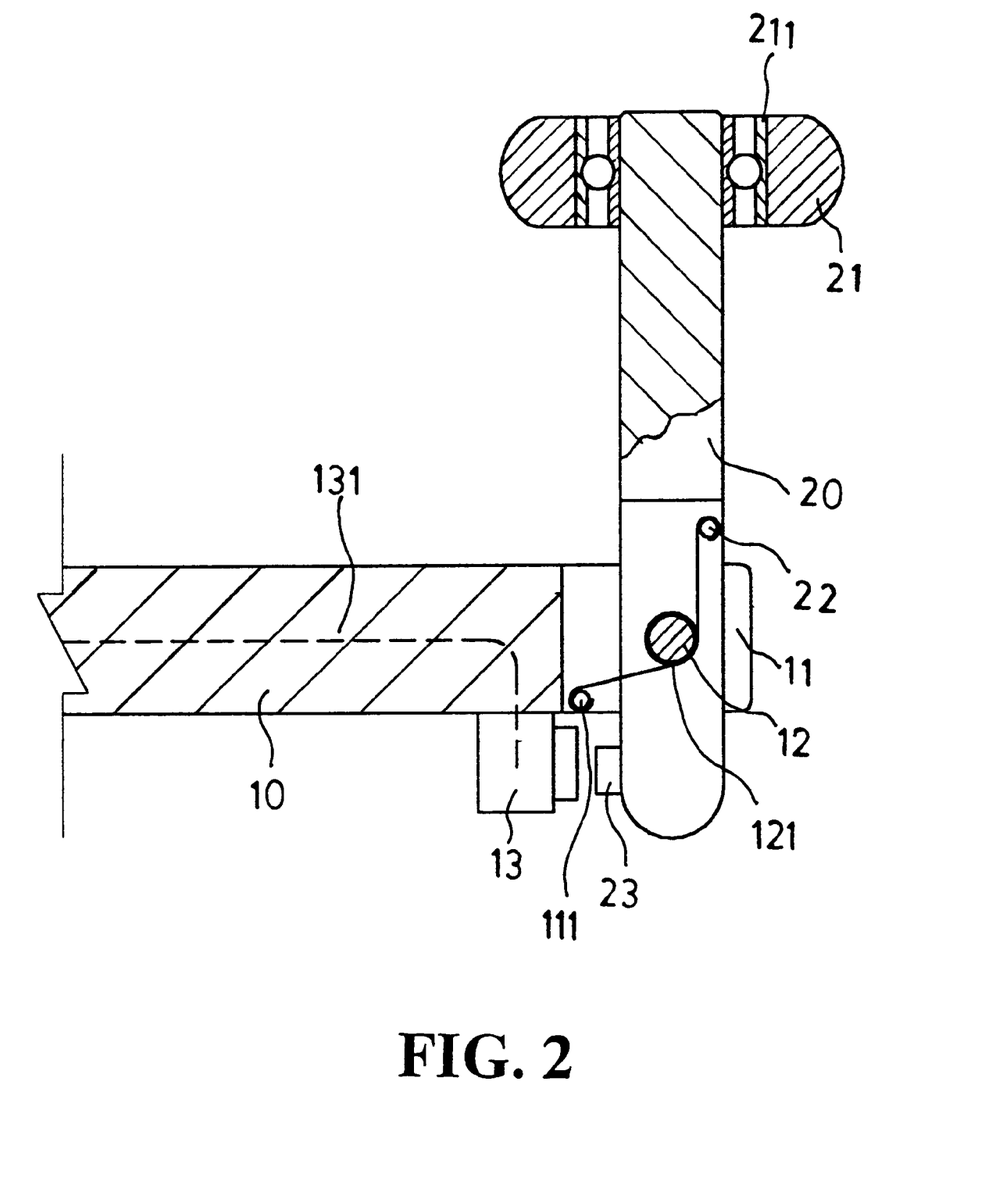
FIG. 2 is a schematic view of the tire-safety sensing device of FIG. 1 in accordance with the present invention.
Figure 3:
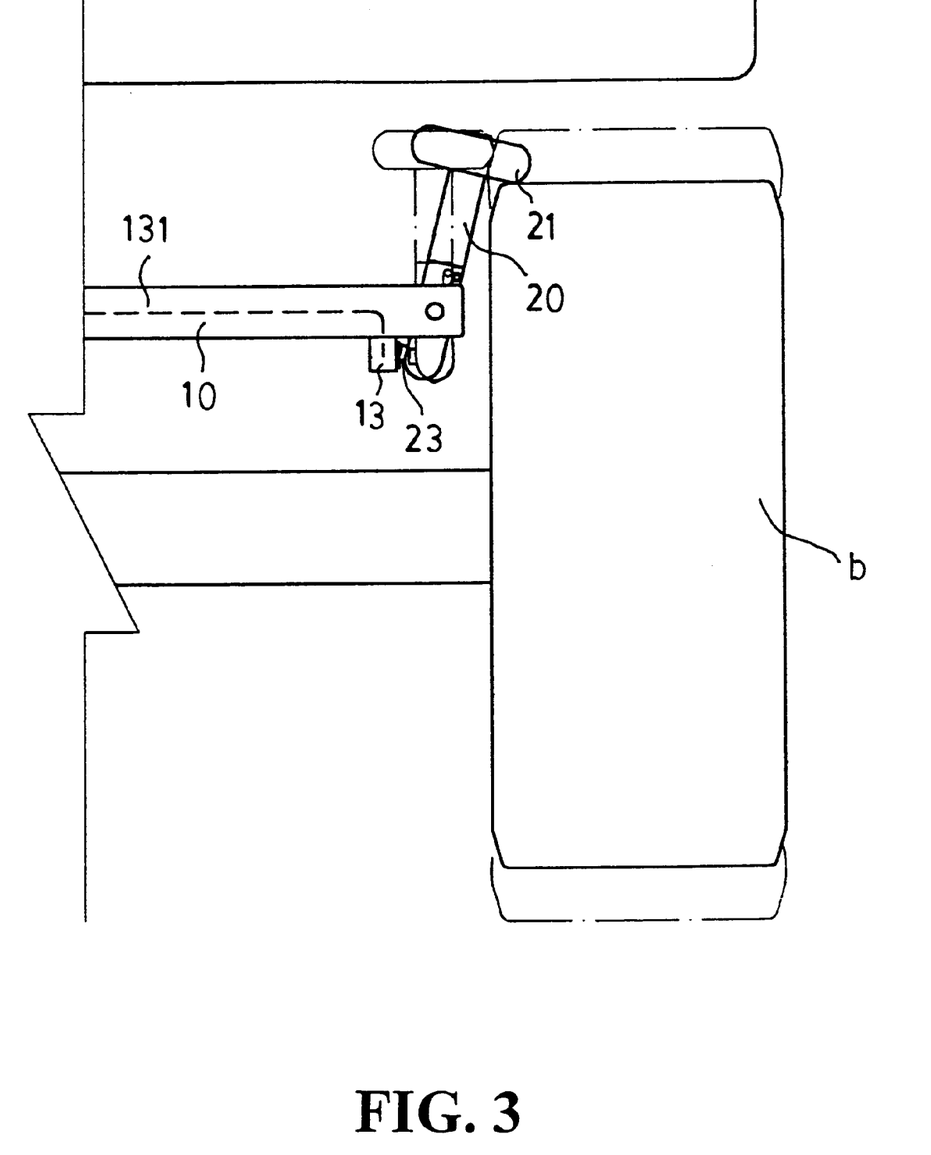
FIG. 3 schematically illustrates the tire-safety sensing device mounted onto the rear wheel in accordance with the present invention.

Referring to FIGS. 1 to 3, there is shown a tire-safety sensing device which is used for the front wheel of a vehicle. In accordance with the present invention, the sensing device comprises a supporting rod 10 having one end connected to the body 9 of the vehicle, located beside the tire b, a fixing peg 12 to pivotally connect the sensing device to a sensing rod 20 to provide a swinging motion, a contacting wheel 21 with a bearing 211 mounted onto the top end of the sensing rod 20, a spring 121 (tortional spring) being mounted to the fixing peg 12, the two ends of the spring 121 being mounted to a protrusion 111 within a notch 11 provided at the supporting rod 10 and a protrusion 22 of the sensing rod 20, the spring 121 urges the sensing rod 20 towards the tire b such that the contacting wheel 21 is in contact with the tire b.

In accordance with the present invention, a micro-switch 13 is mounted on the supporting rod 10, and a conductive wire 131 is connected via the supporting rod 10 to a controlling device (not shown) mounted within the vehicle.

The bottom end of the sensing rod 20, protruded out of the notch 11, is provided with a protruded block 23 corresponding to the micro-switch 13.

When the tire pressure of the tire b is sufficient, the contacting wheel 21 urges the edge of the tire b and the contacting wheel 211 is in a vertical position. At this moment, the protruded block 23 does not contact with the micro-switch 13 positioned at the supporting rod 10. Thus, the controlling device (not shown) within the vehicle will not be activated. If the tire pressure of the tire b is insufficient (as a result of high speed driving or long period of use of tire b), the edge of the tire b will be reduced and the contacting wheel 21 at the top of the sensing rod 20 will incline towards the direction of the tire b as a result of the spring 121. Thus, at this moment the protruded block 23 at the lower section of the sensing rod 20 will contact with the micro-switch 13.

Figure 9:
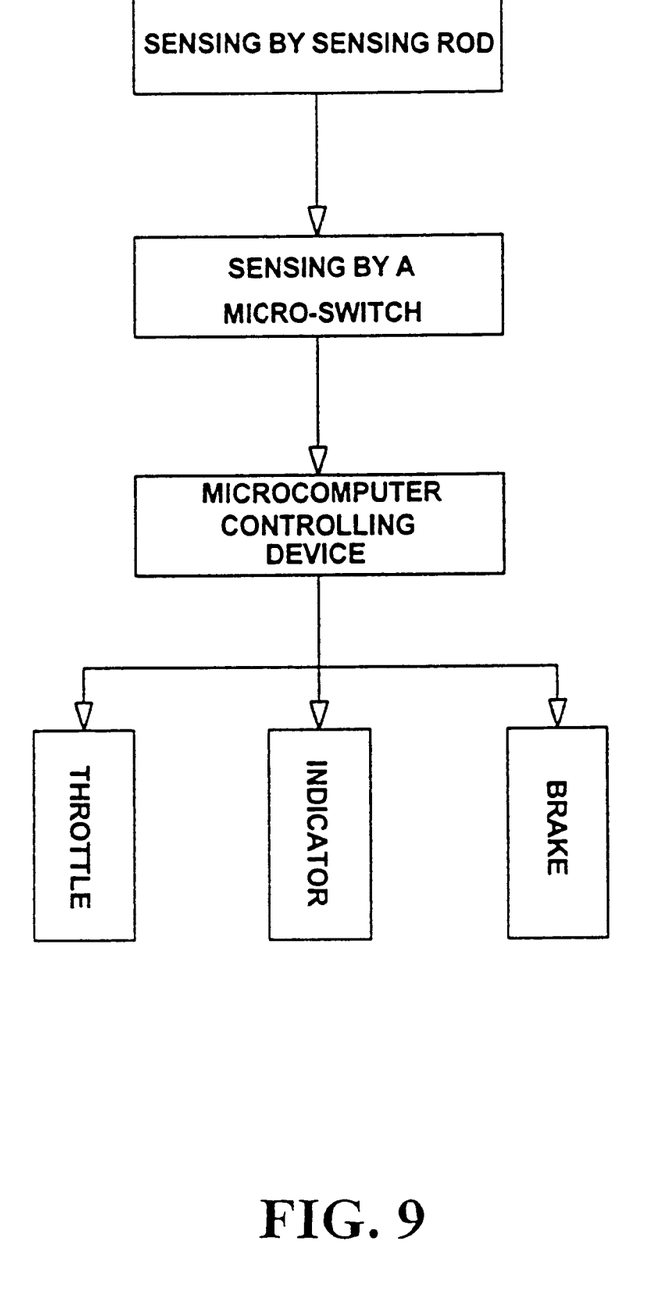
FIG. 9 is a flow chart which shows the action of the sensing device in accordance with the present invention.

As shown in FIG. 9, the micro-switch 13 will cause the micro-computer controlling device (not shown) to be activated via the conductive wire 131. By simple electronic circuits, the throttle and brake indicator will be activated to provide precautionary action. For instance, the throttle is rapidly closed or the brake is applied, or an indicator is lighted to indicate which tire is insufficient in pressure.

Figure 4:
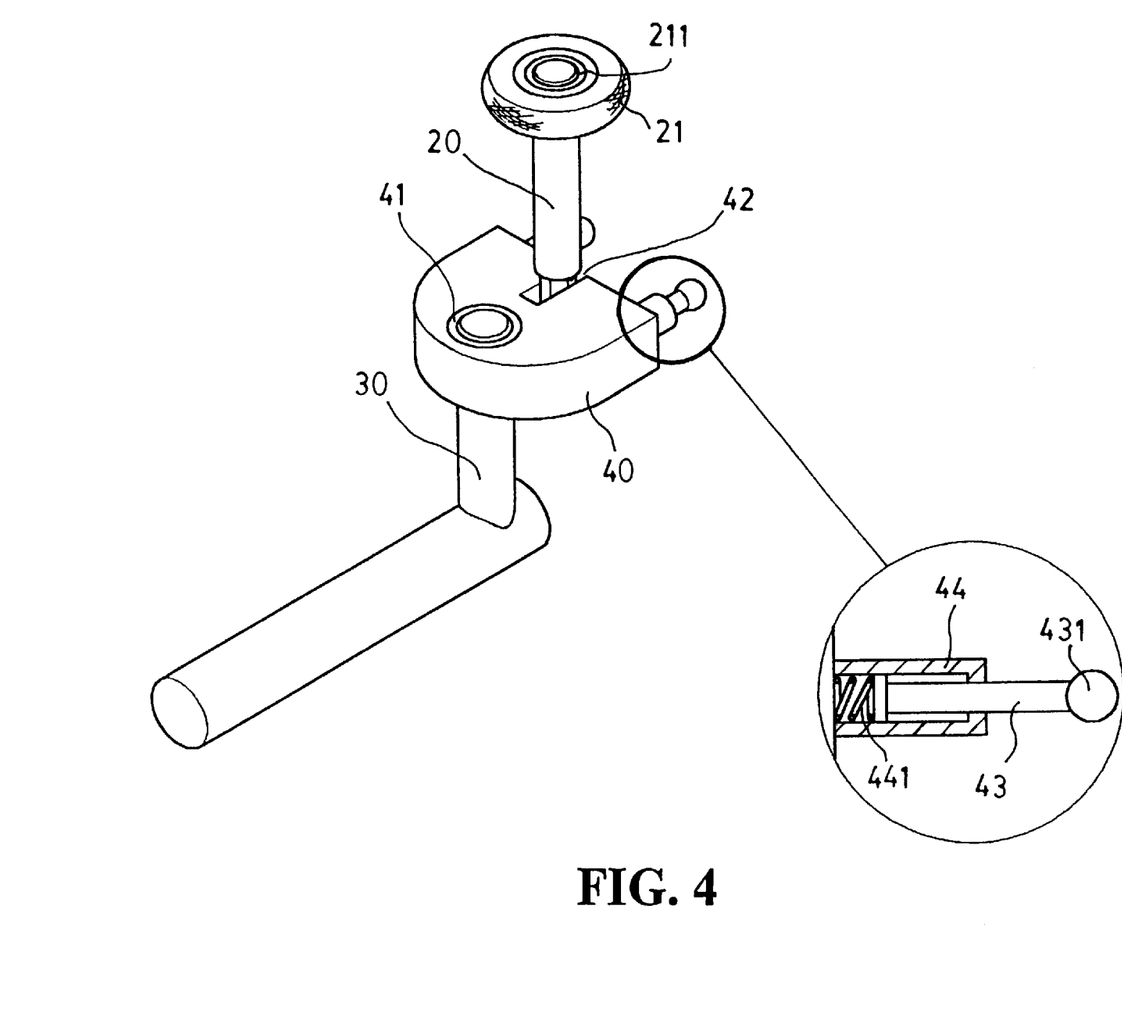
FIG. 4 is a perspective view of the tire-safety sensing device for the front wheel in accordance with the present invention.
Figure 5:
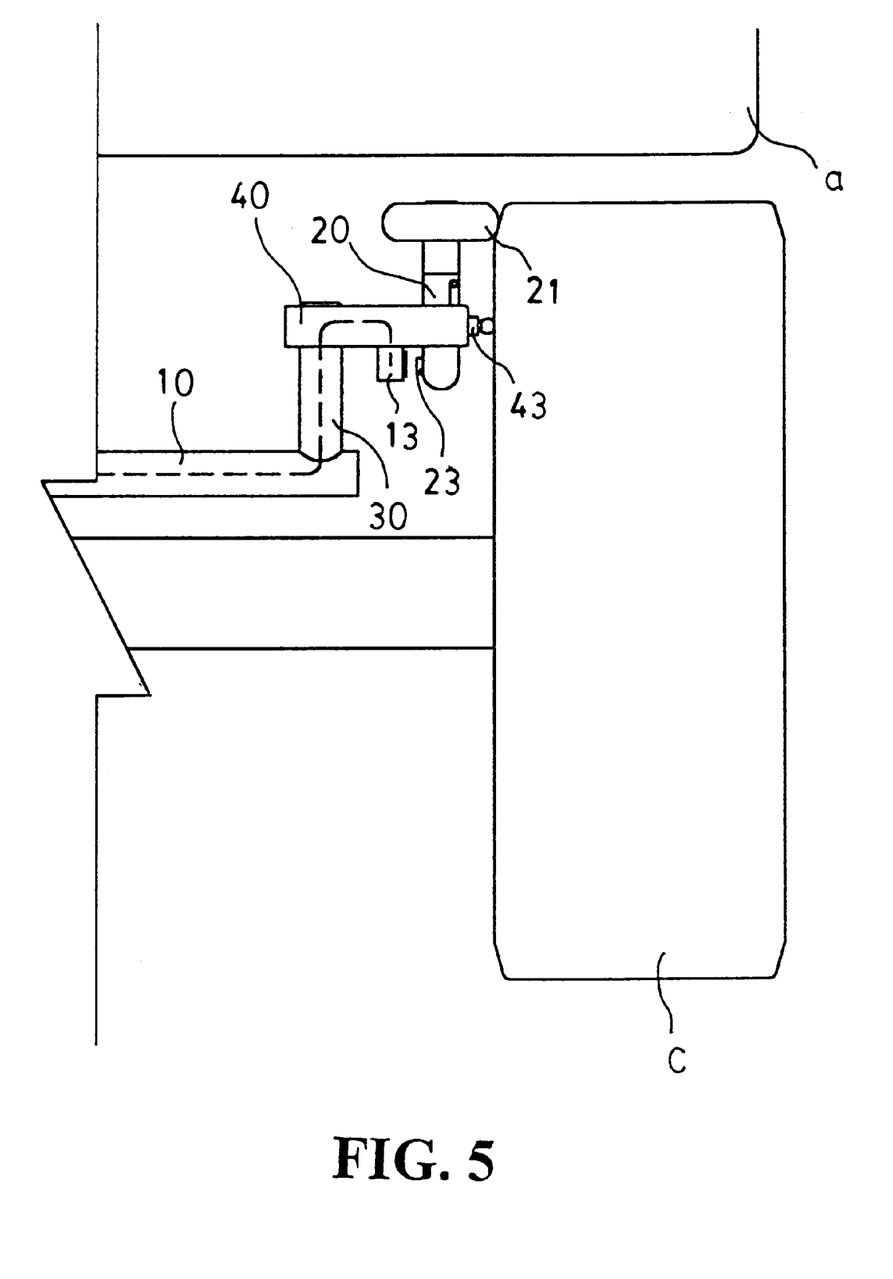
FIG. 5 is a schematic view of the tire-safety sensing device for the front wheel of FIG. 4 applied to the front wheel.
Figure 6:
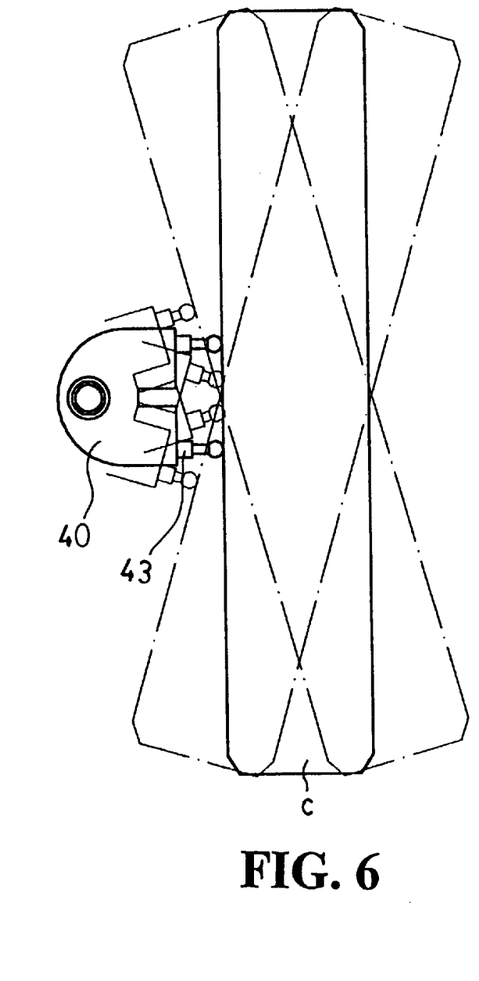
FIG. 6 illustrates the swinging element which is swingable in accordance with the relative swinging action of the tire.

Referring to FIGS. 4, 5 and 6, the tire-safety sensing device is used for the front wheel of the vehicle. On the supporting rod 10, a vertical rod body 30 is mounted. The rod body 30 is mounted with a swinging element 40 having a bearing 41. The swinging element 40 is swingable on the top of the rod body 30. A notch 42 is provided at the front section of the swinging element 40 for the mounting of a sensing rod 20. The bottom section of the swinging element 40 is provided with a micro-switch 13. In addition, the swinging element 40, facing the tire direction, is provided with two elastic top rods 43. The top rod 43 is located within a holding member 44 located on the swinging element 40. The holding member 44 is provided with a spring 41, and therefore, the top rod 43 can be elastically move out, and the front section of the top rod 43 is provided with a ball body 431 which is in contact with the lateral edge of the wheel having the tire C. The ball body 431 should be positioned in such a way to avoid hindering the rotation of the tire C.

In accordance with the present invention, the two top rods 43 are located at the two lateral sides of the center of the tire C. When the tire C rotates, the top rods 43 are urges and the swinging element 40 swings accordingly such that the sensing rod 40 is always in contact with the edge of the tire C at normal condition and to avoid damage caused to the contacting wheel 21 during rotation. When the pressure of tire C is insufficient, the sensing rod 20 will contact with the micro-switch 13 and it will be translated to the controlling device in the vehicle.

Figure 7:
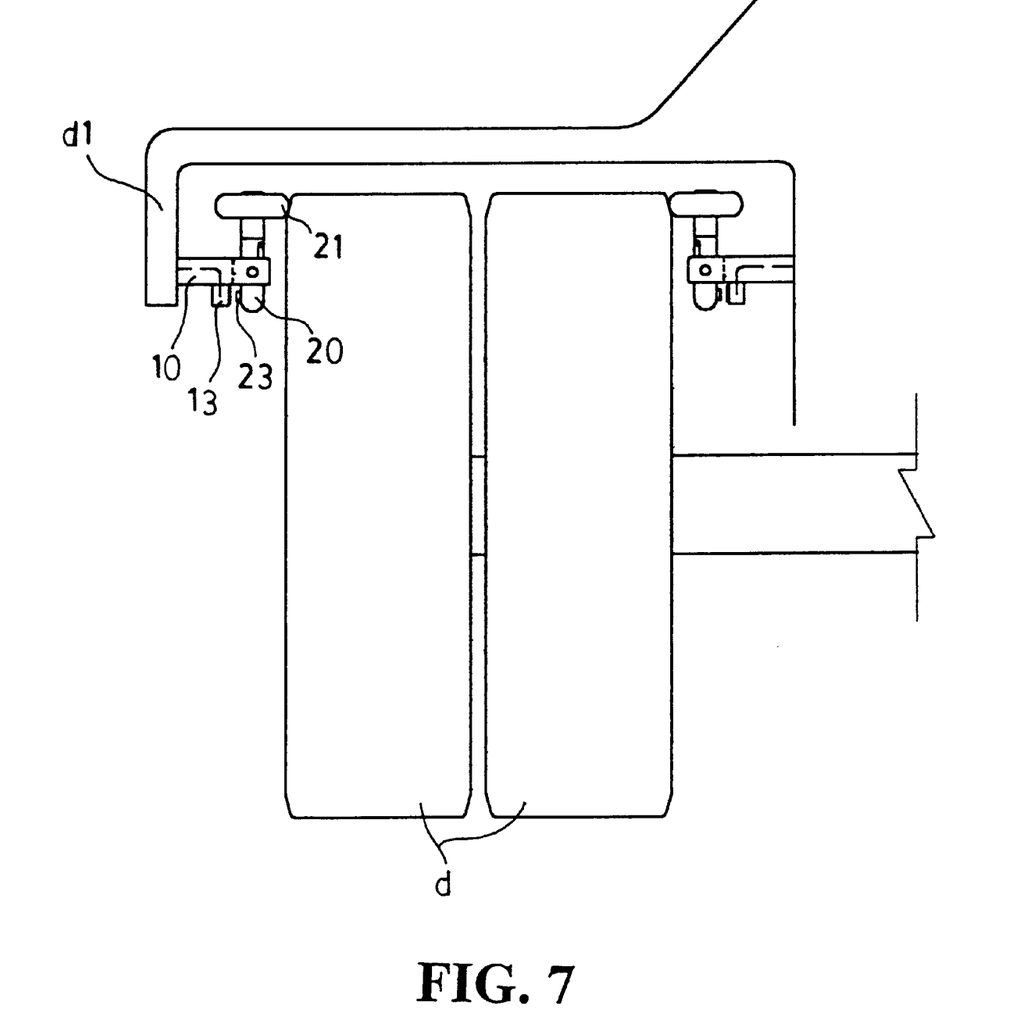
FIG. 7 schematically illustrates the application of the tire-safety device of the present invention onto tires which are arranged in parallel.

Referring to FIG. 7, the present sensing device can also be used on truck mounted with tires in parallel arrangement. In this case, the wheel cover d1 of the truck is mounted with the sensing device and the pressure of the external tire d can be sensed by the sensing device.

Figure 8:
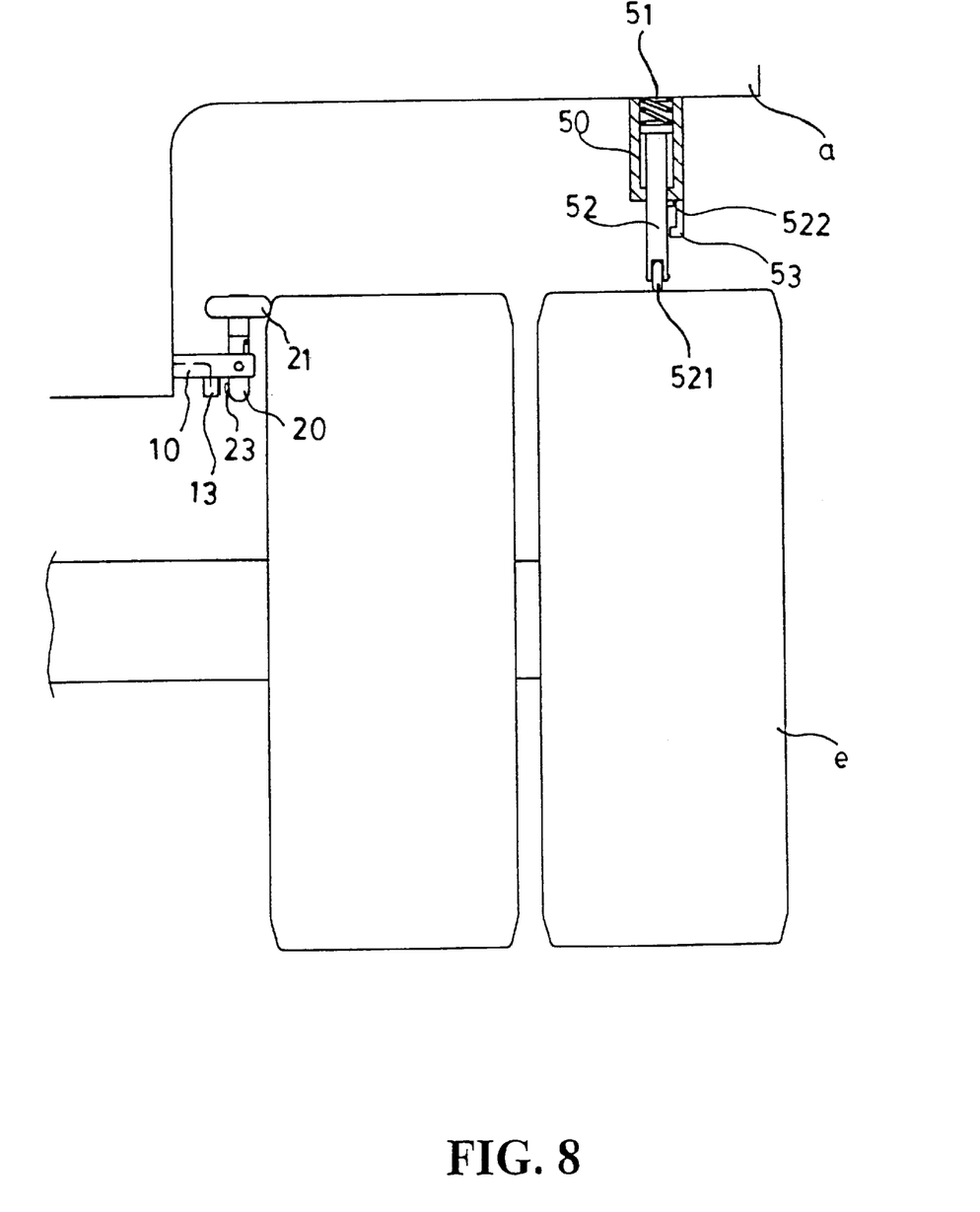
FIG. 8 schematically illustrates the application of the tire-safety device of the present application onto tires for big truck or trailer.

Referring to FIG. 8, for large truck or trailer where there is no wheel cover provided, the body of the vehicle at the top of the tire e is extended with a holding member 50 containing a spring 51 therein, such that a top rod 52 is elastically protruded. The top end of the top rod 52 is provided with a wheel 521 which is elastically in contact with the tire e. A micro-switch 53 is mounted to the holding member 50 and a protrusion 522 is located at the circumferential edge of the top rod 52.

Thus, if the tire pressure of tire e is insufficient, the top rod 52 will not move downward and the protrusion 522 will not contact with the micro-switch 53. If the tire pressure of the tire e is insufficient, the protrusion 522 will move downward to contact with the micro-switch 53 so as to activate the controlling device within the vehicle.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A tire-safety sensing device comprising a supporting rod having one end connected to the body of the vehicle, located beside a tire, a fixing peg to pivotally connect the sensing device to a sensing rod to provide swinging motion, a contacting wheel with a bearing mounted onto the top end of the sensing rod, a spring (tortional spring) being mounted to the fixing peg, the two ends of the spring being mounted to a protrusion within a notch provided at the supporting rod and a protrusion of the sensing rod, the spring urges the sensing rod towards the tire such that the contacting wheel is in contact with the tire.

2. A tire-safety sensing device as set forth in claim 1, wherein a notch is provided at the end section of the supporting rod and a conductive wire is mounted within the supporting rod and is connected to a controlling device within the vehicle, and a protruded block, corresponding to a micro-switch, is mounted to the bottom end of the sensing rod, thereby, insufficient pressure of the tire activates the micro-switch.

3. A tire-safety sensing device as set forth in claim 2, wherein the spring is a tortional spring having two end being mounted to the protrusion of the notch and to the protrusion of the sensing rod.

4. A tire-safety sensing device as set forth in claim 2, wherein a swinging element is mounted in between the sensing device and the supporting rod, and the swinging element is mounted at the rod body located at the supporting rod, the swinging element is provided with the notch for the mounting of the sensing device, and the bottom section of the sensing device is provided with the micro-switch, and a pair of elastic top rods are provided on the swinging element, facing the tire direction, and the front section of an elastic top rod is provided with a ball body to contact with the wheel edge of the tire to avoid the sensing device from damage while the tires rotate.

5. A tire-safety sensing device as set forth in claim 1, wherein the sensing element is mounted at the wheel cover of the vehicle.

6. A tire-safety sensing device as set forth in claim 1, wherein the sensing device is mounted at a holding member extended from the body of the vehicle on top of the tire, the spring is provided to the holding member such that the top rod is elastically extended outward and the rolling wheel at the top end of the top rod can contact with the tire, the holding member is provided with the micro-switch, and the circumferential edge of the top rod is provided with a protrusion, thereby, the tire with insufficient tire pressure causes the protrusion to move downward with the top rod to contact the micro-switch so as to activate the controlling device within the vehicle.

* * * * *